(12) United States Patent
Li

(10) Patent No.: US 6,799,214 B1
(45) Date of Patent: Sep. 28, 2004

(54) SYSTEM AND METHOD FOR EFFICIENT CONTENT DELIVERY USING REDIRECTION PAGES RECEIVED FROM THE CONTENT PROVIDER ORIGINAL SITE AND THE MIRROR SITES

(75) Inventor: Wen-Syan Li, Fremont, CA (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/545,805

(22) Filed: Apr. 8, 2000

Related U.S. Application Data (60) Provisional application No. 60/186,727, filed on Mar. 3, 2000.

(51) Int. Cl.[7] .................. G06F 15/16; G06F 15/173
(52) U.S. Cl. .................. 709/226; 709/203; 709/217; 709/219
(58) Field of Search .................. 709/201, 217, 709/223, 224, 226, 203

(56) References Cited

U.S. PATENT DOCUMENTS

| | | | | |
|---|---|---|---|---|
| 6,108,703 A | * | 8/2000 | Leighton et al. | 709/226 |
| 6,112,239 A | * | 8/2000 | Kenner et al. | 709/224 |
| 6,134,588 A | * | 10/2000 | Guenthner et al. | 709/226 |
| 6,167,441 A | * | 12/2000 | Himmel | 709/217 |
| 6,185,598 B1 | * | 2/2001 | Farber et al. | 709/226 |
| 6,230,196 B1 | * | 5/2001 | Guenthner et al. | 709/223 |
| 6,243,760 B1 | * | 6/2001 | Armbruster et al. | 709/201 |
| 6,286,045 B1 | * | 9/2001 | Griffiths et al. | 709/224 |
| 6,360,262 B1 | * | 3/2002 | Guenthner et al. | 709/226 |
| 6,535,509 B2 | * | 3/2003 | Amicangioli | 370/389 |

* cited by examiner

Primary Examiner—Rupal Dharia
Assistant Examiner—Quang Nguyen
(74) Attorney, Agent, or Firm—Foley & Lardner LLP

(57) ABSTRACT

A content delivery system is disclosed. The content delivery system includes a content provider original site configured for communicating with end users over at least one communication network. The content delivery system also includes a memory accessible by the content provider original site for identifying which content has been stored in a mirror site. In response to an end user request for particular content, the content provider original site is capable of accessing the memory, determining if the requested content is stored in a mirror site, and communicating a page to the requesting end user containing a meta-tag for redirecting the requesting end user to load the requested content from the mirror site.

32 Claims, 5 Drawing Sheets

SYSTEM AND METHOD FOR EFFICIENT CONTENT DELIVERY USING REDIRECTION PAGES RECEIVED FROM THE CONTENT PROVIDER ORIGINAL SITE AND THE MIRROR SITES

CROSS-REFERENCE TO RELATED APPLICATIONS

Embodiments of the present invention relate to a U.S. Provisional application entitled "CachePortal: Architecture and Functionalities," U.S. Ser. No. 60/186,727, filed Mar. 3, 2000, the contents of which are incorporated by reference herein.

BACKGROUND OF THE INVENTION

1. Field of the Invention

The present invention relates, generally, to content delivery networks and, in preferred embodiments, to systems and methods for efficient redirection of content requests to mirror sites using http meta-tag protocols to improve content delivery services.

2. Description of the Related Art

Web performance is a key point of differentiation among content providers. Crashes and slowdowns within major web sites demonstrate the difficulties companies face in trying to deal with high web traffic. As Internet backbone technologies have developed, many innovations in the area of service management have improved bandwidth and web content retrieval response time. These improvements to infrastructure, however, cannot solve traffic problems at all points within the Internet.

Figure 1:
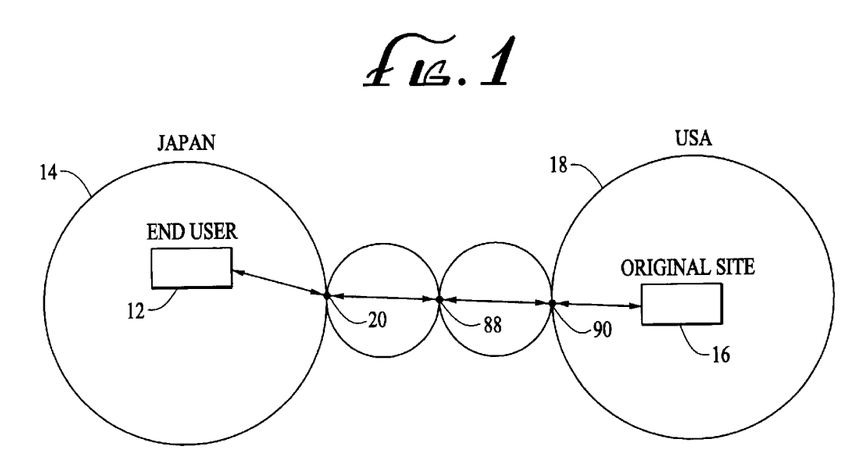
FIG. 1 is a block diagram illustrating an example of a conventional content delivery path between an end user and a web site.

For example, assume in FIG. 1 that an end user 12 in a network 14 in Japan requests access to a page from a web site 16 in a network 18 the United States. (For the purpose of simplifying the description, end users may be described herein as requesting or receiving content. However, it should be understood that the end user's Web browser actually requests or receives the content.) The request must pass through several gateways 20, 88, and 90 before reaching web site 16. Although web site 16 may have large bandwidth (the ability to rapidly communicate large quantities of data), the gateways connecting the network 14 in Japan to the network 18 in the United States may be slow, and thus, when end user 12 attempts to access the page from web site 16, the gateways may create a bottleneck. Such gateway bottlenecks may result in the access time for one page of data being on the order of 10 seconds or more. Because of the gateway bottlenecks, and because there are many uncertainties along the Internet paths from end user 12 to/from web site 16, content delivery networks or systems are now being developed.

Fundamentally, content delivery systems are designed for two major purposes; one is to achieve load balancing, and the other is to reduce overall response time. A content delivery system may be implemented using a high speed dedicated line to deliver content while bypassing all gateways or reducing the number of Internet gateways in the transmission path. However, such a dedicated system is expensive. Another approach to implementing content delivery systems is through the use of intelligent caching, mirroring, proxy servers, or other techniques which redirect end users to available servers that contain copies of the requested content and that are close to (quickly accessible by) the end users. With some of the traffic redirected, traffic surges will decrease and end users will benefit from faster response time. The term generally used for the architecture and functionality of such networks or systems is content delivery services (CDS).

Figure 2:
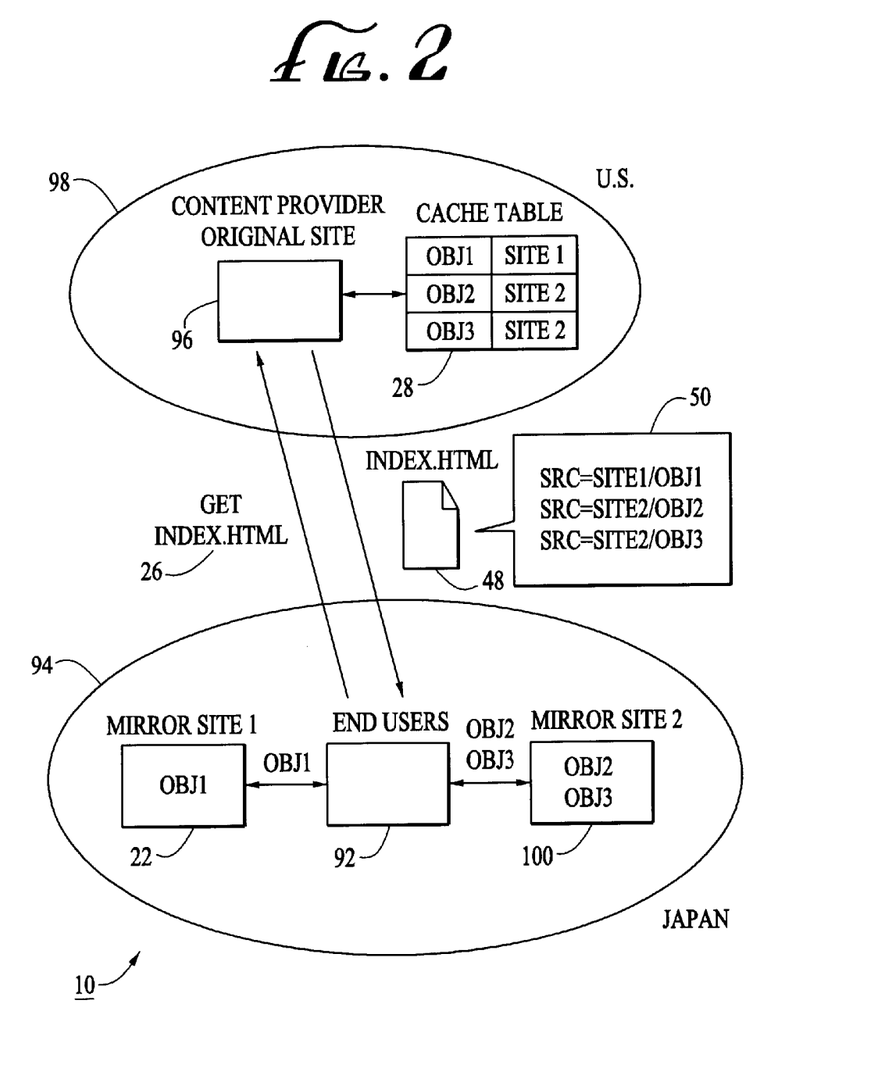
FIG. 2 is a block diagram illustrating an example of a conventional embedded object redirection content delivery system.

FIG. 2 is a block diagram illustrating an example of a conventional embedded object redirection content delivery system 10. In the example of FIG. 2, an end user 92 located within a local network 94, e.g., in Japan, requests access to a web page containing object 1 (obj1), object 2 (obj2), and object 3 (obj3) from a remote content provider original site 96 located within a network 98 in, e.g., the United States. Obj1, obj2, and obj3 may comprise, for example, three images.

In the example system of FIG. 2, mirror sites 22 and 100 are employed in the Japanese network 94. These mirror sites 22 and 100 generally contain copies of content stored in content provider original site 96. Access to a mirror site located within the same network as the local or requesting end user 92 often results in faster access time. Thus, in the example of FIG. 2, when end user 92 in Japan requests data from content provider original site 96, it would generally be much faster if end user 92 was able to access the data from a mirror site 22 or 100 in Japan, rather than accessing the image from content provider original site 96 in the United States and transferring the image across various Internet gateways. Of course, end user 92 must somehow be informed that the desired content can be accessed from a closer (e.g. more quickly accessible) source.

To facilitate this communication, content provider original site 96 maintains a cache table 28, or accesses a cache table 28 maintained by another system, to keep track of the objects that been copied into the various mirror sites. Cache table 28 may contain a list all of the various objects or images that have been copied into other mirror sites, a mapping of the objects and the specific mirror sites that store copies of these objects, and the location of these mirror sites. In addition, cache table 28 may also contain a mapping of partial IP addresses (e.g. the most significant segments of the IP address) to the closest mirror site for those partial IP addresses.)

The "closest" mirror site is the mirror site for which response time is the fastest. Content provider original site 96 uses cache table 28 to locate a closer location from which end user 92 can access the desired content. It should be noted that although end users 92 and mirror sites 22 and 100 may be geographically close, they may be located on completely different networks. Thus, the process of selecting and copying content into a mirror site and informing end user 92 that the desired content can be found in a particular mirror site is not necessarily a simple matter of geography. Content provider original site 96 may determine the closest mirror site using the mapping in cache table 28.

In the system of FIG. 2, when end user 92 first requests access to a web page within content provider original site 96, it is in the form of a "get index.html" request 26. Content provider original site 96 receives this request and first determines that end user 92 is from Japan because of the IP address information contained in the request. Assume, for purposes of this example, that the requested web page contains obj1, obj2, and obj3. Because content provider original site 96 has access to cache table 28 and also knows that requesting end user 92 is located in Japan, a customized index.html page 48 is sent back to end user 92 containing address information 50 indicating that obj1 is located in mirror site 1 (see reference character 22) in Japan, and that obj2 and obj3 are located in mirror site 2 (see reference character 100), also in Japan.

When end user 92 receives and parses the customized index.html page 48, it determines that there are three embedded objects, obj1, obj2, and obj3. End user 92 then sends one "get object" request for each object. However, instead of requesting the objects from content provider original site 96 in the United States, end user 92 instead requests obj1 from mirror site 1, and requests obj2 and obj3 from mirror site 2. In summary, content provider original site 96 modifies the index.html page sent back to end user 92, and redirects end user 92 to alternate locations where the same object information has been mirrored for faster access. The process is transparent to the end user.

One disadvantage with the embedded object redirection content delivery system of FIG. 2 results from the fact that only objects are mirrored. Thus, although a requested page may contain links to other pages, modified index.htnl page 48 will not contain redirection information for those pages. If a user wants to access these linked pages, a separate page request for each page must be directed to content provider original site 96.

Furthermore, because all pages must be fetched from content provider original site 96, some of the processing capability within content provider original site 96 must be reserved for processing all the initial requests, and preparing and transmitting customized index.html pages 48, which could be large. This added processing may be significant, especially when cache table 28 is very large. In addition, because a modified index.html page 48 must be transmitted by content provider original site 96 for every page request, a full modified index.html page 48 (including the complete text of the page) must pass through the Internet gateways for each page request, which will affect the speed of every page request.

Another disadvantage with the content delivery system of FIG. 2 is related to input/output media delivery. In the system of FIG. 2, although much of the actual transfer of content may occur between end users 92 and mirror sites in locations remote to content provider original site 96, e.g. such as in Japan, content provider original site 96 may continue to have high input/output traffic because it must receive all the initial requests 26 and prepare and transmit a modified index.html page 48 for each request. Thus, even though content may be dispersed into various mirror sites in other locations, crashes may still occur because of excessive input/output traffic associated with content provider original site 96.

Figure 3:
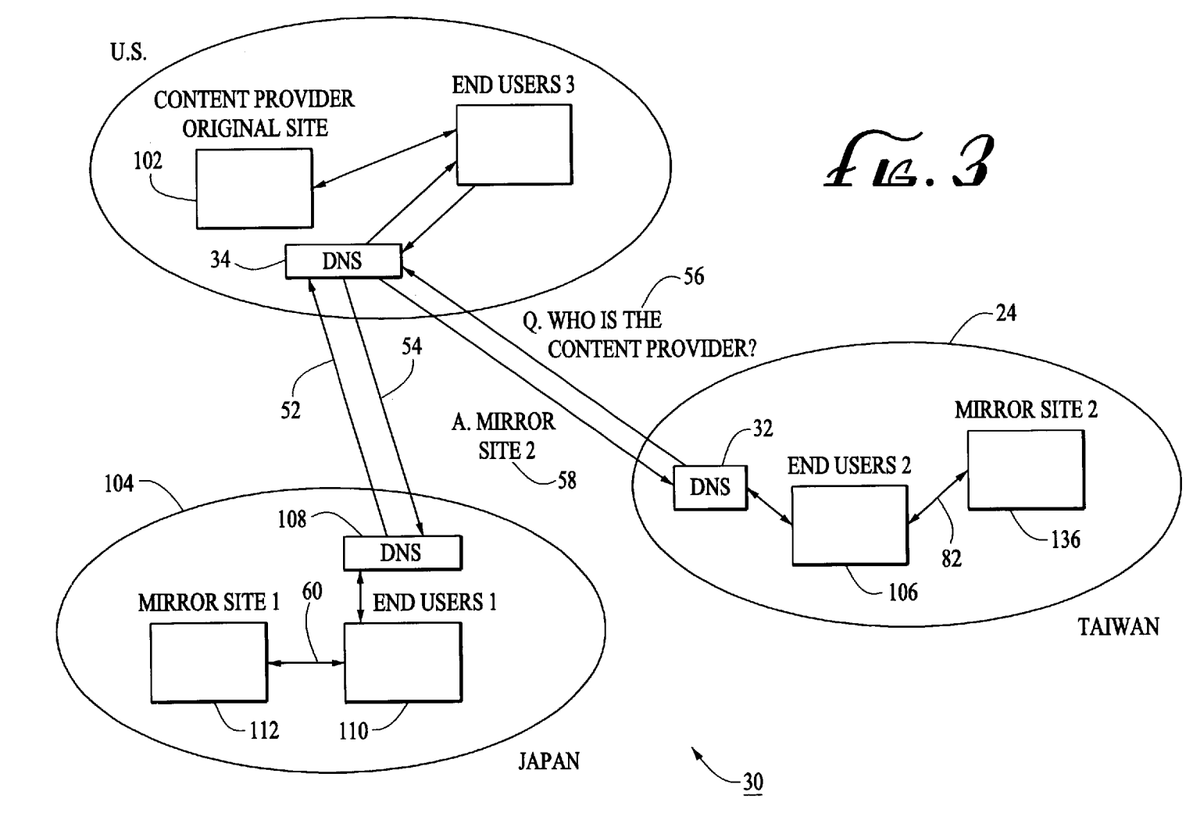
FIG. 3 is a block diagram illustrating an example of a conventional domain name server (DNS) redirection content delivery system.

FIG. 3 is a block diagram illustrating an example of a typical domain name server (DNS) redirection content delivery system 30.

A brief introduction to DNSs will now be provided. Generally, end users determine the physical address associated with a particular domain name using a network of DNSs. A DNS converts a domain name such as NEC.com, which is easier for humans to remember, into a physical address comprised of a string of numbers, which is appropriate for computer processing, by looking up a table of domain name/IP address mappings. The DNS network is structured like an inverted tree with an international DNS at the top. This international DNS can provide address information to direct a user to other DNSs such as .com or .edu DNSs in the United States, or a .jp DNS in Japan. These DNSs can provide further address information to direct a user to, for example, NEC.com. DNSs may be operated by a particular Internet service provider, or by companies within an intranet.

Thus, for example, if an end user wishes to access NEC.com, the end user first looks up the desired domain name "NEC.com" by initiating a request to a local DNS. The local DNS communicates the desired domain name to an international DNS, which then directs the local DNS to a .com DNS in the United States. The .com DNS then directs the local DNS to the server for NEC.com by communicating the physical address of the NEC.com server back to the local DNS.

In the example of FIG. 3, content provider original site 102 is located in the United States. A special-purpose DNS identified as DNS redirection server 34, also located in the United States, is used as a front end for content provider original site 102. In addition, mirror site 2 (see reference character 136) is employed in a Taiwan network 24 and mirror site 1 (see reference character 112) is employed in a Japan network 104. These mirror sites contain a copy of the content stored in the content provider original site 102. Access to a mirror site located within the same network as the requesting end user often results in faster access time. Thus, in the example of FIG. 3, when end user 106 in Taiwan requests content from content provider original site 102, it would generally be much faster if end user 106 was able to access the content from mirror site 2 in Taiwan, rather than accessing the image from content provider original site 102 in the United States and transferring the image across the Internet gateways. Of course, end user 106 must somehow be informed that the desired content can be accessed from a closer source.

FIG. 3 contains a conceptual illustration of how the DNS redirection network performs this function. In FIG. 3, end user 106 in Taiwan, through a local DNS 32, sends a request to DNS redirection server 34 for specific content and asks, in essence, "who is the content provider server?" (See reference character 56.) DNS redirection server 34 then determines the closest mirror site for the requested content (mirror site 2, in this example), and, in essence, sends a message back to local DNS 32 with an answer of "mirror site 2" (see reference character 58). Local DNS 32 then communicates "mirror site 2" back to end user 106, who would then request the specific content from mirror site 2 (see reference character 82).

To perform this redirection function, DNS redirection server 34 must keep track of the address of each mirror site. A more detailed description of the typical content delivery system of FIG. 3 will now be given with reference to the Japan network 104. When a request for the address of the content provider original site (see reference character 52) is received from a local DNS 108 in Japan network 104, DNS redirection server 34 will determine, from the address information contained within the request, the location of requesting end user 110. DNS redirection server 34 will then identify mirror site 1 (see reference character 112) which is closer to requesting end user 110, based on geographical location and network configuration. DNS redirection server 34 will then communicate the physical address of the identified mirror site 1 back to local DNS 108 (see reference character 54). Thus, local DNS 108 will store the physical address for mirror site 1, rather than the physical address for content provider original site 102. Once local DNS 108 stores the physical address of mirror site 1, future requests for the content provider original site made to local DNS 108 will be immediately directed to the physical address of mirror site 1.

After local DNS 108 stores the physical address for mirror site 1, this address is communicated back to end user 110. End user 110 will then communicate with mirror site 1 (see reference character 60) to obtain the desired content.

Because the DNS redirection content delivery system of FIG. 3 is limited to the redirection of domain name addresses, local DNS 108 only stores the address of mirror site 1, and does not have more specific address information such as the address of other web pages or objects. This is a significant drawback. Specific content must still be located from within mirror site 1. Thus, in the system of FIG. 3, the mirror sites must not only contain a copy of all of the content from content provider original site 102, but also the software such as a database system to search for the desired objects within that content. In contrast, in the system of FIG. 2, only certain objects are stored in the mirror sites, and the actual search for the desired objects is performed in content provider original site 96 in the United States. Thus, in the example system of FIG. 2, mirror sites 22 and 100 act merely as web servers that fetch information.

Referring again to the system of FIG. 3, once local DNS 108 stores the address of mirror site 1, an expiration time begins to count down. During that time, any end user that requests content provider original site 102 through local DNS 108 will be directed to mirror site 1. Once local DNS 108 has stored a physical address for mirror site 1, local DNS 108 will continue sending end users that request content provider original site 102 to that same physical address from that time forward until the expiration time.

Another disadvantage of the system of FIG. 3 is that once a local DNS 108 has stored a physical address for a mirror site, local DNS 108 will send all end users to that same physical address, regardless of the traffic status of the mirror site. If mirror site 112 is overloaded with requests, nothing can be done to remove the load until the physical address for mirror site 112 stored in local DNS 108 has expired.

One variation on the example DNS redirection content delivery system 30 of FIG. 3 (but not shown in FIG. 3) uses a program called a mobile agent to send data and route end users to particular mirror sites in a more controlled fashion. This variation on the system of FIG. 3 interposes some additional functions and intelligence between the end user and the local DNS in the form of one or more processing algorithms. For example, if an end user 110 in Japan requests access to content provider original site 102 for one particular purpose, e.g. to fetch video, that end user 110 might be directed to a mirror site 112 in Japan. However, another end user, also in Japan, may request access to content provider original site 102 for a different purpose, e.g. to purchase airline tickets. This end user might be directed instead to a mirror site in the United States.

A disadvantage with this variation on the system of FIG. 3 is that the various DNSs around the world are operated by different organizations and companies. These entities are generally reluctant to allow an intelligent routing program, not within their control, to reside within their DNSs and redirect traffic to different locations. Such entities generally want to maintain control of routing, and do not want to give up such control. Because of these problems, this variation on the system of FIG. 3 is most applicable when integrated within an organization that owns all of its own DNSs and/or network routers, where there is no division of ownership within routing control.

SUMMARY OF THE DISCLOSURE

Therefore, it is an advantage of embodiments of the present invention to provide a system and method for providing content delivery services that allows a requesting end user to be redirected to different mirror sites by transmitting a redirection page back to the end user containing a http protocol meta-tag but no content. The http protocol meta-tag redirects the end user to closely situated mirror sites to access whole pages (the complete text of pages) and objects, minimizing the number of content fetches that must pass through Internet gateways.

It is a further advantage of embodiments of the present invention to provide a system and method for providing content delivery services that allows both pages and objects to be mirrored. Thus, if an end user sends a redirected request to a mirror site for a page containing embedded objects and links to other pages, a whole page will be sent back to the end user that may provide address information for fetching embedded objects and linked pages from mirror sites without having to request the embedded objects and linked pages from the original content provider, thereby minimizing traffic at the original content provider.

It is a further advantage of embodiments of the present invention to provide a system and method for providing content delivery services that allows a selectable portion of a web site, such as the home page, and a selectable number of objects in those pages, to be mirrored.

It is a further advantage of embodiments of the present invention to provide a system and method for providing content delivery services wherein the relationship between the content provider and the content delivery network may be tightly or loosely coupled. In a tightly coupled relationship, the content provider may maintain tables identifying mirrored content and the location of mirror sites which contain that content, maintain a mapping of partial IP addresses to mirror sites closest to those partial IP addresses, and generate modified HTML pages containing redirection information. In addition, the content provider may provide the processing and control for copying content into the mirror sites. In a loose association between the content provider and the content delivery network, the content provider need only maintain a table of which content has been mirrored. When a request for mirrored content is received, the content provider need only direct the requestor to reload the desired content from a special-purpose server, which may then generate modified HTML pages containing redirection information. The ability to have a loosely coupled relationship may be advantageous to smaller content providers, who do not have the resources to establish and maintain a tightly coupled relationship with the content delivery network.

These and other advantages are accomplished according to a content delivery system which includes a content provider original site configured for communicating with end users over at least one communication network. The content delivery system also includes a memory accessible by the content provider original site for identifying which content has been stored in a mirror site. In response to an end user request for particular content, the content provider original site is capable of accessing the memory, determining if the requested content is stored in a mirror site, and communicating a redirection page to the requesting end user containing a meta-tag for redirecting the requesting end user to load the requested content from the mirror site.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention. For example, although the following discussion is presented with reference to Internet applications, it should be understood that embodiments of the present invention also apply to Intranet applications. In addition, although the exemplary figures referenced herein illustrate circular representations of networks encompassing various functional blocks, it should be understood that embodiments of the present invention are not limited to systems with the illustrated network configurations.

Although web sites may have large bandwidth, the gateways connecting Internet networks may be slow, and thus when end users attempt to access content from web sites in different networks, the gateways may create a bottleneck. Such gateway bottlenecks may result in the access time for one page of data being on the order of 10 seconds or more. Because of the gateway bottlenecks, and because of other uncertainties along the Internet paths from end user to web site, content delivery networks or systems are now being developed.

Figure 4:
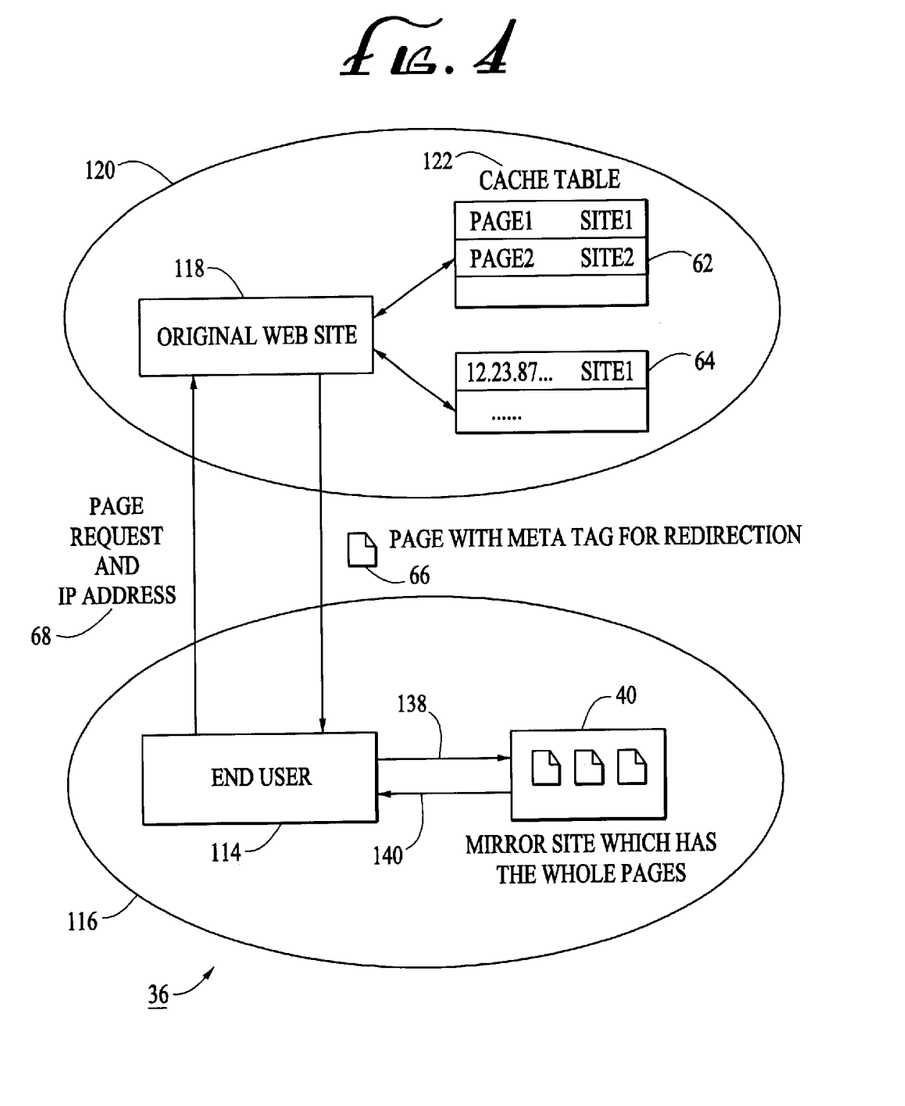
FIG. 4 is a block diagram illustrating an example content delivery system according to a preferred embodiment of the present invention.

FIG. 4 is a block diagram illustrating an example content delivery system 36 according to a preferred embodiment of the present invention. In the example of FIG. 4, an end user 114 is located within a second network 116 and a content provider original site 118 is located within a first network 120. In addition, a CachePortal mirror site 40 is employed in second network 116. It should be understood that the configuration of FIG. 4 is merely exemplary, and that in preferred embodiments multiple end users and multiple CachePortal mirror sites may be located in different networks. Furthermore, although FIG. 4 illustrates an end user 114 communicating with a CachePortal mirror site 40 in second network 116, it should be understood that it is not necessary that an end user and a CachePortal mirror site be located in the same network.

CachePortal mirror sites may be independently established CachePortal servers, or they may comprise processing and memory rented from existing servers. Memory, as defined herein, includes, but is not limited to, hard disks, tape drives, random access memory (RAM), read-only memory (ROM), floppy disks, compact disks, and the like. The various CachePortal mirror sites contain whole pages (the entire text portion) copied from content provider original site 118. For example, page 1 might reside in CachePortal mirror site 40 in second network 116, while page 2 might reside in a CachePortal mirror site in another location. In addition, CachePortal mirror sites may contain some of the objects embedded in these pages. However, it should be understood that the whole pages stored in CachePortal mirror site 40 may be different from the whole pages stored in content provider original site 118, because some of the embedded objects in the page may be stored in a different location. The modification of the page (determining where embedded objects should be stored) may be performed by the content provider original site 118 or CachePortal mirror site 40.

For purposes of illustration only, assume that end user 114 requests access to a web page within content provider original site 118 (see reference character 68). In the embodiment of FIG. 4, content provider original site 118 maintains a cache table 122 identifying the pages stored in CachePortal mirror sites (see reference character 62), the locations of those CachePortal mirror sites (see reference character 64), and a mapping of partial IP addresses to mirror sites closest to those partial IP addresses (not shown in FIG. 4). Content provider original site 118 may use table 62 to determine a CachePortal mirror site from which end user 114 can access the requested page. In preferred embodiments, the partial IP address mapping is used to locate a CachePortal mirror site from which end user 114 can access the requested page more quickly than from content provider original site 118. This CachePortal mirror site is selected based the physical address of end user 114 contained in the request itself. Of course, if the desired page has not been mirrored, then content provider original site 118 will send the whole desired page directly to end user 114.

In alternative embodiments, because either content provider original site 118 or a mirror site 40 may be the closest location from which to access the requested page, the closest location may be determined empirically. Either the content provider original site 118, the mirror site 40, or both, may send out a small program (a "cookie") attached to a content page. The "cookie" will send back its "arrival time" at the user's site. Based on the difference between the "departure time" from content provider original site 118 or mirror site 40 and the user site arrival time, the response time for either location may be determined.

However, if a more easily accessible CachePortal mirror site 40 is located, content provider original site 118 will transmit a "first redirection page" 66 back to end user 114 containing no content, but which contains a meta-tag which instructs the end user's browser to reload (refresh) the desired page from CachePortal mirror site 40. The meta-tag is defined in HTTP protocol. Note that "browser," as defined herein, includes, but is not limited to, combinations or parts of display programs, parsers, or communication programs. In addition, "meta-tag," as defined herein, includes, but is not limited to, other specifications or tags defined in http protocol which perform similar functions.

For purposes of illustration only, and independent of FIG. 4, the following is an example of a redirection instruction to a Japanese mirror site based on the initial URL of www.nec-.com in the United States according to an embodiment of the present invention. The instruction causes the web browser of the local requesting end user (in, e.g., Japan) to refresh immediately from http://jp_mirror1.cacheportal.com/nec_usa_mirror/jp/index.html:

<head>
<title>NEC USA Homepage</title>
<meta http-equiv="Refresh" content "0;
url=http://jp_mirror1.cacheportal.com/nec_usa_mirror/jp/index.html">
</head>

Once first redirection page 66 is received by end user 114, a "first redirected request" 138 is sent by end user 114 to CachePortal mirror site 40. To understand how CachePortal mirror site 40 processes the first redirected request, further explanation of CachePortal mirror sites according to embodiments of the present invention is necessary.

In preferred embodiments of the present invention, when content is copied from content provider original site 118 into a particular CachePortal mirror site 40, a mirror site table (not shown in FIG. 4) is also copied into that CachePortal mirror site 40. The mirror site table is a subset of cache table 122, and contains the IP address and directory locations (i.e. URLs) of all embedded objects and linked pages in the pages stored in that CachePortal mirror site 40.

Therefore, after first redirected request 138 is received by CachePortal mirror site 40, the mirror site table is read to determine available URLs for any embedded objects or linked pages in the requested page. CachePortal mirror site 40 may then send a whole page 140 back to end user 114, containing the full text of the page and also the URL information for any embedded objects or linked pages in the page. The embedded objects and linked pages may be stored in the same mirror site, other mirror sites, or even content provider original site 118. If end user 114 issues additional requests to fetch these linked objects or pages, end user 114 will be directed to those linked objects or pages which may be stored in a mirror site without having to go back to the content provider original site 118.

Alternatively, CachePortal mirror site 40 may send a "second redirection page" back to end user 114 containing no content, but which contains a meta-tag which instructs the end user's browser to reload (refresh) the desired page from another CachePortal mirror site 40 or even content provider original site 118.

Unlike the system of FIG. 3, which must store a complete copy of the content provider original site in a mirror site, embodiments of the present invention illustrated in FIG. 4 can store selected portions of the content in CachePortal mirror site 40. This flexibility is advantageous in that certain content is more suitable for mirroring than other content. For example, one user may access an Internet service provider site for navigation purposes only, while another may access the same site to use a search engine. In embodiments of the present invention, it may be a good allocation of resources to store the web pages and objects to be navigated in CachePortal mirror site 40, but it may not be a good allocation of resources to store the search engine software in CachePortal mirror site 40.

In addition, unlike the system of FIG. 2, in which all pages must be fetched as whole pages (complete text pages) from content provider original site 118 and only objects are mirrored, embodiments of the present invention illustrated in FIG. 4 allow a requesting end user to be redirected to closely situated mirror sites to access whole pages and objects, minimizing the number of content fetches from content provider original site 118 that must pass through Internet gateways.

Figures 5, 6:
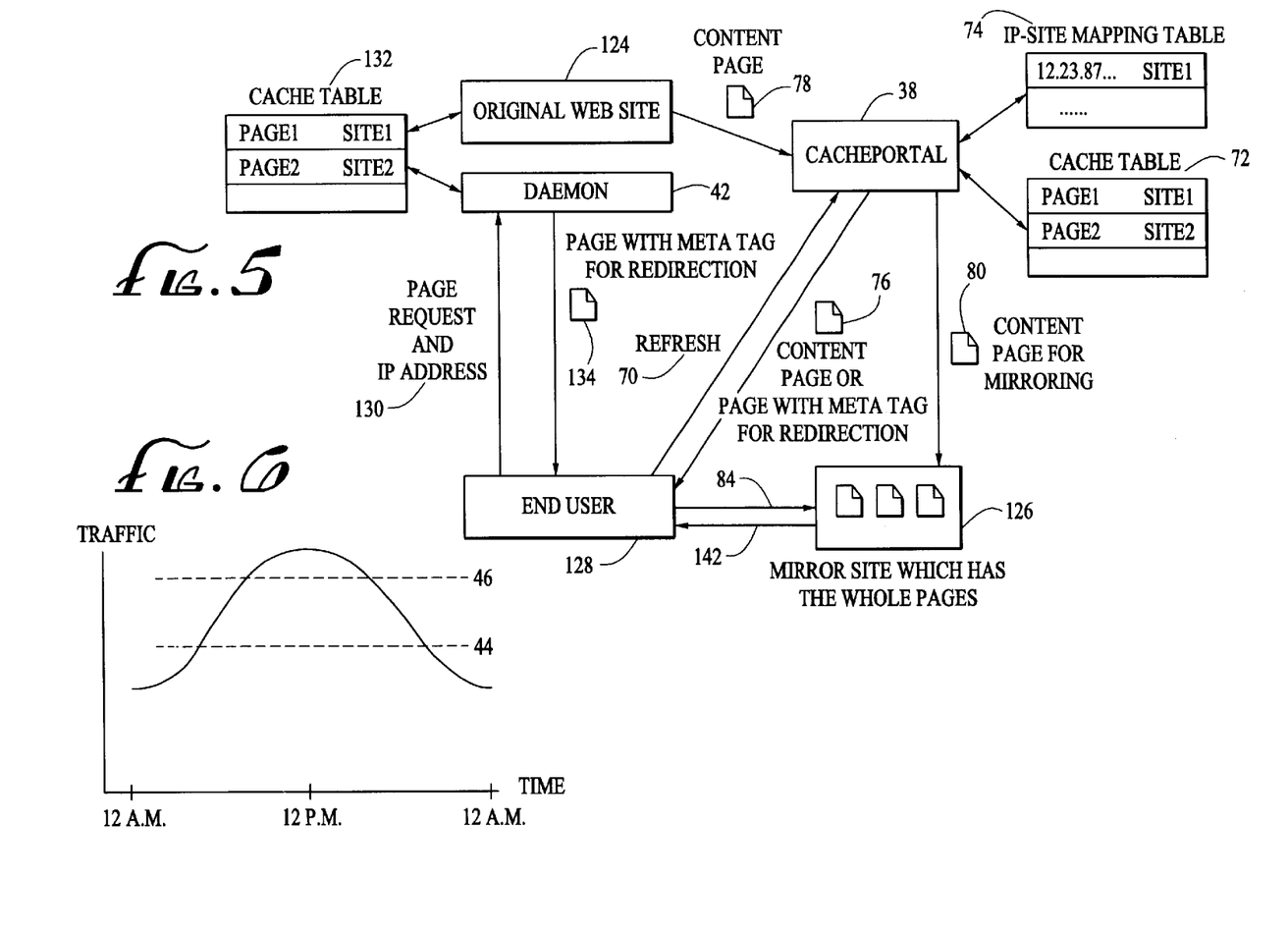
FIG. 5 is a block diagram illustrating an example content delivery system according to an alternative embodiment of the present invention.
FIG. 6 is a graph of traffic versus time illustrating the function of a daemon program according to an embodiment of the present invention.

FIG. 5 illustrates an alternative embodiment of the present invention, wherein a special-purpose server identified as CachePortal server 38 is associated with content provider original site 124. It should be noted that CachePortal server 38 and content provider original site 124 may be located in different locations and networks. In addition, one or more CachePortal mirror sites 126 are employed in other locations. The various CachePortal mirror sites 126 contain whole pages (complete text pages) copied from content provider original site 124. For example, page 1 might reside in one CachePortal mirror site, while page 2 might reside in another CachePortal mirror site. In alternative embodiments, CachePortal server 38 may also act as a mirror site and store whole pages copied from content provider original site 124. However, it should be understood that the whole pages stored in CachePortal mirror site 126 or CachePortal server 38 may be different from the whole pages stored in content provider original site 124, because some of the linked pages or embedded objects in the page may be stored in a different location. The modification of the page (determining where embedded objects should be stored) may be performed by the content provider original site 124, CachePortal server 38, or CachePortal mirror site 40.

In further alternative embodiments, associated with content provider original site 124 is a daemon program 42 that operates under the control of content provider original site 124. However, daemon program 42 may also be controlled by CachePortal server 38. One purpose of daemon program 42 can be explained with reference to FIG. 6, which illustrates an example graph of requests to access content provider original site 124 versus time. Typically, traffic at content provider original site 124 stays below a first warning threshold 44, considered to be normal operating conditions. However, if the amount of traffic should rise above first warning threshold 44, but below a second warning threshold 46, significant delays or messages to users indicating that the content provider original site 124 is not available may occur. Above second warning threshold 46, usage is so great that that a system crash is possible. Thus, one purpose of daemon program 42 is to reroute traffic to ensure that the traffic for content provider original site 124 is maintained below first warning threshold 44. It should be understood, however, that the system of FIG. 5 can function without daemon program 42, or that daemon program 42 may reroute traffic independent of any warning thresholds, simply for providing faster delivery of content to users.

Referring again to FIG. 5, when content provider original site 124 (or CachePortal server 38 in alternative embodiments) detects that traffic is above first warning threshold 44, content provider original site 124 may command daemon program 42 to redirect some user requests to CachePortal server 38. In one alternative embodiment of the present invention, daemon program 42 may redirect every third request to CachePortal server 38 instead of content provider original site 124. In other alternative embodiments, other criteria for redirecting requests may be employed, as will be described in further detail below.

For purposes of illustration only, assume that end user 128 requests access to a web page within content provider original site 124 (see reference character 130). In alternative embodiments, content provider original site 124 maintains a cache table 132 identifying which pages have been mirrored in CachePortal server 38 or CachePortal mirror sites 126. Cache table 132 may also keep track of which pages are stored in each mirror site. If content provider original site 124 determines from cache table 132 that the desired page has been mirrored, and if the request has been selected for redirection by daemon program 42, the request is redirected to CachePortal server 38. To perform this redirection, content provider original site 124 will transmit a "first redirection page" 134 back to end user 128 containing no content, but which contains a meta-tag which instructs end user 128 to reload the desired page from CachePortal server 38. Of course, if the desired page has not been mirrored, then daemon program 42 will route the request to content provider original site 124, and content provider original site 124 will send the whole desired page directly to end user 128.

Assume, for purposes of illustration only, that the desired page has been mirrored and that the request has been selected for redirection by daemon program 42. End user 128 will then transmit a "first redirected request" in an attempt to request the desired page from CachePortal server 38 (see reference character 70). In alternative embodiments, CachePortal server 38 maintains a cache table 72 of mirrored web pages, an IP-site mapping table 74 that stores the locations of the mirrored web pages, and a mapping of partial IP addresses to mirror sites closest to those partial IP addresses (not shown in FIG. 5). It should be understood that in alternative embodiments, cache table 72, IP-site mapping table 74, and partial IP address mapping may be physically located with CachePortal server 38 or content provider original site 124. CachePortal server 38 may then use these tables and the partial IP address mapping to determine the closest mirror site from which end user 128 can access the desired page. In alternative embodiments, because either content provider original site 124, CachePortal server 38, or a mirror site 126 may be the closest location from which to access the requested page, the closest location may be determined empirically. Either the content provider original site 124, CachePortal server 38, a mirror site 126, or any combination thereof, may send out a small program (a "cookie") attached to a content page. The "cookie" will send back its "arrival time" at the user's site. Based on the difference between the "departure time" from content provider original site 124, CachePortal server 38, or mirror site 126 and the user site arrival time, the response time for any of these locations may be determined.

CachePortal server 38 will then transmit a "second redirection page" back to end user 128 (see reference character 76) containing a meta-tag which instructs end user 128 to reload the desired page from the closest location. This server is determined based on the location of end user 128, which can be determined from the physical address of end user 128 contained in the request itself. Alternatively, CachePortal server 38 may send the whole page (complete text page) to end user 128 if CachePortal server 38 stores the page and is closest to end user 128, or if all mirror sites are busy.

In the example of FIG. 5, the closest location is CachePortal mirror site 126. Thus, once second redirection page 76 is received by end user 128, a "second redirected request" 84 is sent by end user 128 to CachePortal mirror site 126. After second redirected request 84 is received by CachePortal mirror site 126, the mirror site table is read to determine the address of any embedded objects or linked pages in the requested page. (It should be understood that the previous discussion of CachePortal mirror sites and mirror site tables provided with reference to the embodiments of FIG. 4 is equally applicable to the embodiments of FIG. 5.) CachePortal mirror site 126 may then send a whole page 142 back to end user 128, containing the full text of the page and also the address information for any embedded objects or linked pages in the page. The embedded objects and linked pages may be stored in the same mirror site, other mirror sites, CachePortal server 38, or even content provider original site 124. End user 128 may then send additional requests to fetch these objects or pages. If end user 128 issues additional requests to fetch these linked objects or pages, end user 128 will be directed to those linked objects or pages without having to go back to the content provider original site 124.

Alternatively, CachePortal mirror site 126 may send-a "third redirection page" back to end user 128 containing no content, but which contains a meta-tag which instructs the end user's browser to reload (refresh) the desired page from another CachePortal mirror site 126, CachePortal server 38, or even content provider original site 124.

For example, if end user 128 can access content provider original site 124 faster than CachePortal mirror site 126, CachePortal server 38 or mirror site 126 may actually redirect end user 128 directly back to content provider original site 124, bypassing daemon program 42 so that end user 128 gets direct access to content provider original site 124. Alternatively, if the content is located within CachePortal server 38, CachePortal server 38 may send the desired content directly back to end user 128, and no "redirection page" will be transmitted.

FIG. 5 also illustrates how content is distributed in embodiments of the present invention. In preferred embodiments, CachePortal server 38 analyzes redirection traffic activity and selects content to be mirrored according to various criteria described below. In one alternative embodiment, content is selectively copied from content provider original site 124 to CachePortal server 38 (see reference character 78), and then is copied into CachePortal mirror sites 126 (see reference character 80). In other alternative embodiments, content is selectively copied from content provider original site 124 directly into CachePortal mirror sites 126.

One criteria for selecting content to be mirrored is update frequency. Frequently updated content is generally a poorer candidate for mirroring, because of the likelihood that the mirrored content may be outdated in a very short time and require re-fetch. On the other hand, frequently queried content or large objects such as images are generally better candidates for mirroring, because of the potential time savings when accessing mirror sites. In addition, it is generally advantageous to mirror a whole directory of content, such as all the pages in a web site, because of the likelihood that a user may access several pages in the directory in a short time period. Mirroring an entire directory of content also results in more consistent response time, which may be preferable to users because linked pages will likely be found in the mirror site due to crosslinks. Thus, when users navigate through a directory, all pages will be delivered directly through mirror sites without requesting pages from the original site. User location may also be considered. Content requested by remote users is generally a better candidate for mirroring, again because of the potential time savings when accessing mirror sites.

In preferred embodiments, CachePortal server 38 also analyzes redirection traffic activity and selects mirror sites according to various criteria. Mirror sites are generally best suited to store content frequently accessed by users close to the mirror site. However, it may be advantageous to store content accessed by the same user in different mirror sites, to enable parallel fetching. For example, if a web page includes three embedded objects, it may be advantageous to store each object in a different mirror site. Such a scheme may allow the user to fetch each image in parallel and improve access time. In addition, storing objects in different mirror sites may be advantageous to achieve load balancing and avoid excessive traffic at any one mirror site.

In alternative embodiments of the present invention, CachePortal server 38 may simply report traffic activity to a content provider, who may then analyze the traffic and dictate the mirroring of content to CachePortal server 38.

CachePortal mirror sites 126 may comprise several servers, with one of the servers designated as a manager server. In alternative embodiments of the present invention, the manager servers from all CachePortal mirror sites 40 may communicate their own traffic activity to each other and analyze the traffic instead of CachePortal server 38. The manager servers would then determine content to be mirrored as well as the mirror sites that will store the content.

Content stored in the various CachePortal mirror sites 126 is typically assigned an expiration time when the content is first copied. In preferred embodiments, there are at least two reasons for assigning expiration times. One reason is to ensure that mirrored content does not permanently occupy memory in the mirror site. Another reason is related to the business model. For example, content providers may only utilize the CachePortal system for a fixed time period during each day. In such an example, mirrored content will be set to expire at the end of that fixed time period.

In one alternative embodiment of the present invention, the CachePortal mirror sites 126 keep track of this expiration time. In another alternative embodiment, CachePortal server 38 keeps track of the expiration time. If the content expires at a time when the content provider is entitled to use the CachePortal system, either CachePortal server 38 or the content provider may initiate a refresh of the mirrored content. If the content expires at a time when the content provider is not entitled to use the CachePortal system, the content may be deleted from the CachePortal mirror sites 126. In the example of FIG. 5, if end user 128 attempts to access a page that has expired and has not been refreshed, CachePortal mirror site 126 can send an error message to the end user, or redirect end user 128 to access the content from content provider original site 124.

It should be understood that although the previous discussion of mirroring criteria, content distribution, and expiration time was presented in the context of FIG. 5, it is equally applicable to embodiments of the present invention illustrated in FIG. 4.

As noted above, alternative embodiments of the present invention exist with regard to the redirection of end user requests. Daemon program 42 may base its redirection criteria on the requestor's IP address or geographic location. For example, daemon program 42 may accept end user requests originating from the United States, but redirect all requests originating from Japan to a CachePortal mirror site in Japan. In other alternative embodiments, daemon program 42 may redirect requests for content only during certain hours, such during peak traffic hours.

It should be noted that the major difference between the embodiments of the present invention illustrated in FIGS. 4 and 5 is that the redirection function is performed by content provider original site 118 in FIG. 4, while the redirection function is performed by a separate CachePortal server 38 in FIG. 5. Thus, the system of FIG. 5 may be utilized for content providers that do not want the complications and burdens of integrating CachePortal functionality; that is, keeping track of the location of mirrored content.

Therefore, embodiments of the present invention provide a system and method for providing content delivery services that allows a requesting end user to be redirected to different mirror sites by transmitting a redirection page back to the user containing a http meta-tag protocol but no content. The redirection page redirects the end user to closely located mirror sites to access whole pages (the complete text of pages) and objects, minimizing the number of content fetches that must pass through Internet gateways.

In addition, embodiments of the present invention allows both pages and objects to be mirrored. Thus, if an end user sends a redirected request to a mirror site for a page containing embedded objects and links to other pages, a whole page will be sent back to the end user that may provide address information for fetching embedded objects and linked pages from mirror sites without having to request the embedded objects and linked pages from the original content provider, thereby minimizing traffic at the original content provider. Furthermore, embodiments of the present invention allow a selectable portion of a web site, such as the home page, and a selectable number of objects in those pages, to be mirrored.

Embodiments of the present invention also provide a system and method for providing content delivery services using http meta-tag protocols wherein the relationship between the content provider and the content delivery network may be tightly or loosely coupled. In a tightly coupled relationship, the content provider maintains tables identifying the mirrored content and the location of mirror sites which contain that content, and generates modified HTML pages containing redirection information. In addition, the content provider typically provides the control for copying content into the mirror sites. In a loose association between the content provider and the content delivery network, the content provider need only maintain a table of which content has been mirrored. When a request for, mirrored content is received, the content provider need only direct the requester to reload the desired content from a special-purpose server, which may then generate modified HTML pages containing redirection information. The ability to have a loosely coupled relationship may be advantageous to smaller content providers, who do not have the resources to establish a tightly coupled relationship with the content delivery network, and to users such as universities or corporations who are not truly content providers.

What is claimed is:

1. A content delivery system for responding to requests for content from at least one requesting end user browser, the system comprising:

a content provider original site for storing content and communicating with the at least one requesting end user browser over at least one communication network; and at least one mirror site for storing content copied from the content provider original site and communicating with the at least one requesting end user browser over the at least one communication network;

wherein the content provider original site is programmed for providing particular content in response to a requesting end user browser's request for said particular content if permitted criteria are not met as determined by a daemon program; and is further programmed for communicating a first redirection page to the requesting end user browser in response said requesting end user browser's request for particular content and only if predetermined criteria are met as determined by the daemon program, the first redirection page not containing the requested content and containing a meta-tag for completely specifying a communication network address redirecting the requesting end user browser to load the particular content from a particular mirror site; and said daemon program, upon satisfaction of said predetermined criteria, selectively directing said content provider original site to send the first redirection page to the requesting end user browser;

wherein in response to the first redirection page, the requesting end user browser is programmed for sending a first redirected request to the particular mirror site, the first redirected request containing the requesting end user browser's request for particular content; and wherein in response to the first redirected request, the particular mirror site is programmed for providing the particular content requested by the end user browser and is further programmed in the event such content is not available at said mirror site, for communicating a second redirection page to the requesting end user browser containing a meta-tag for redirecting the requesting end user browser to load the particular content from another minor site or the content provider original site.

2. A content delivery system as recited in claim 1, further including a first memory accessible by the content provider original site for storing an internet protocol (IP) address of the at least one mirror site and for storing a mapping indicating which content has been copied into each mirror site;

wherein in response to the requesting end user browser's request for particular content, the content provider original site is further programmed for accessing the first memory, determining if the particular content is stored in said particular mirror site, and communicating the first redirection page to the requesting end user browser for redirecting the requesting end user browser to load the particular content from said particular mirror site if the particular content has been stored in said particular mirror site.

3. A content delivery system as recited in claim 2, wherein the content provider original site is further programmed for determining an end user IP address from the requesting end user browser's request for particular content, selecting said particular mirror site that stores the particular content and is quickly accessible by the requesting end user browser, and communicating the first redirection page to the requesting end user browser for redirecting the requesting end user browser to load the particular content from the particular mirror site.

4. A content delivery system as recited in claim 1, wherein in response to the first redirected request, the particular mirror site is programmed for communicating a whole page back to the requesting end user browser containing the IP address of any embedded objects or linked pages that have been copied into the particular mirror site.

5. A content delivery system as recited in claim 4, wherein in response to receipt of the whole page, the requesting end user browser is further programmed for requesting any embedded objects or linked pages from mirror sites containing copies of the embedded objects or linked pages.

6. A content delivery system for responding to requests for content from at least one requesting end user browser, the system comprising:

a content provider original site for storing content and communicating with the at least one requesting end user browser over at least one communication network;

a CachePortal server, serving as a first mirror site for storing content at least partially duplicative of the content contained in the content provider original site for processing requests for content and communicating with the at least one end user browser over the at least one communication network;

at least a second mirror site for storing content at least partially duplicative of content contained in the content provider original site and communicating with the at least one requesting end user browser over the at least one communication network; and wherein in response to a requesting end user browser's request for particular content, the content provider original site communicates a first redirection page to the requesting end user browser only if predetermined criteria are met as determined by a daemon program, said first redirection page containing no content and containing a first meta-tag for redirecting the requesting end user browser to the CachePortal server;

wherein the CachePortal server receives a first redirected request from the requesting end user browser, the first redirected request containing the requesting end user's request for particular content;

wherein in response to the first redirected request, the CachePortal server is programmed for communicating the particular content to the requesting end user browser if the CachePortal server contains the particular content; and wherein the CachePortal server is further programmed for communicating a second redirection page to the requesting end user browser containing a second meta-tag for redirecting the requesting end user browser to load the particular content from the second mirror site when browser the CachePortal server does not contain the particular content.

7. A content delivery system as recited in claim 6, further including a first memory accessible by the content provider original site for identifying which content has been stored in the second mirror site;

wherein in response to the requesting end user browser's request for particular content, the content provider original site is further programmed for accessing the first memory, determining if the particular content is stored in the second mirror site, and communicating the second redirection page to the requesting end user browser only if the requested content has been stored in the second mirror site.

8. A content delivery system as recited in claim 7, further including a plurality of second mirror sites and a second memory accessible by the CachePortal server for storing an internet protocol (IP) address of the plurality of second mirror sites and for storing a mapping indicating which content has been copied into each of said plurality of second mirror sites;

wherein in response to the first redirected request, the CachePortal server is further programmed for accessing the second memory, determining if the requested content is stored in one or more of said plurality of second mirror sites and the IP address of any such second mirror sites, and communicating the second redirection page to the requesting end user browser for redirecting the requesting end user browser to load the particular content from one or more of said second mirror sites if the particular content has been stored in the one or more second mirror sites.

9. A content delivery system as recited in claim 8, wherein in response to the first redirected request, the CachePortal server is further programmed for determining an end user browser address from the first redirected request, accessing the second memory, locating one or more second mirror sites that store the particular content, selecting a particular second mirror site that is quickly accessible by the requesting end user browser, and communicating the second redirection page to the requesting end user browser for redirecting the requesting end user browser to load the particular content from the particular second mirror site.

10. A content delivery system as recited in claim 9, wherein in response to the second redirection page, the requesting end user browser is further programmed for communicating a second redirected request to the particular second mirror site, the second redirected request containing the requesting end user browser's request for particular content.

11. A content delivery system as recited in claim 10, wherein in response to the second redirected request, the second mirror site is programmed for communicating a third redirection page to the requesting end user browser containing a meta-tag for redirecting the requesting end user browser to load the particular content from another of the plurality of second mirror sites, the CachePortal server, or the content provider original site.

12. A content delivery system as recited in claim 10, wherein in response to the second redirected request, the particular second mirror site is programmed for communicating a whole page back to the requesting end user browser containing the IP address of any embedded objects or linked pages that have been copied into the at least one mirror site.

13. A content delivery system as recited in claim 12, wherein in response to receipt of the whole page, the requesting end user browser is further programmed for requesting any embedded objects or linked pages from mirror sites containing copies of the embedded objects or linked pages.

14. A content delivery system as recited in claim 8, wherein the daemon predetermined criteria includes directing the content provider original site to communicate the first redirection page to the requesting end user browser after every third request for particular content from any end user browser.

15. A content delivery system as recited in claim 8, wherein the daemon predetermined criteria includes directing the content provider original site to communicate the first redirection page to the requesting end user browser only after receiving a request for particular content from requesting end user browsers in a particular location.

16. A content delivery system as recited in claim 8, wherein the daemon predetermined criteria includes directing the content provider original site to communicate the first redirection page to the requesting end user browser only during a particular time period.

17. A content delivery system as recited in claim 8, wherein the daemon predetermined criteria includes directing the content provider original site to communicate the first redirection page to the requesting end user browser when traffic at the content provider original site rises above a predetermined level.

18. A method for content delivery from a content provider original site and a mirror site connected to an end user browser on a network, the method comprising the step of:
 (a) determining, by using a deamon program, and in response to a requesting end user browser's request, if predetermined conditions are satisfied;
 (b) sending, from the content provider original site the requested content to the requesting end user browser if the predetermined conditions are not satisfied;
 (c) directing, by means of said deamon program, said content provider original site to send a first redirection page to the requesting end user browser upon determining that said predetermined conditions are satisfied;
 (d) communicating, in response to the directing step, the first redirection page from a content provider original site to the requesting end user browsers the first redirection page not containing the requested content and containing a meta-tag for completely specifying a network address for redirecting the requesting end user browser to load the particular content from said mirror site;
 (e) sending, from the mirror site, said requested content to said requesting end user browser if said content is available at said mirror site, and if said content is not available, then,
 (f) communicating a second redirection page from the mirror site to the requesting end user browser containing another meta-tag for redirecting the requesting end user browser to load the particular content from another mirror site.

19. A method for content delivery as recited in claim 18, wherein in response to the first redirected request, the method further includes the step of communicating a whole page from the mirror site to the requesting end user browser containing the IP address of any embedded objects or linked pages that have been copied into at least one mirror site.

20. A method for content delivery as recited in claim 19, wherein in response to receipt of the whole page, the method further includes the step of communicating a request from the requesting end user browser to other mirror sites containing copies of the embedded objects or linked pages, for those embedded objects or linked pages.

21. A method for content delivery on a network comprising the steps of:
 receiving, at a content provider original site, a request for content from a requesting end user browser;
 determining, by using a deamon program, and in response to a requesting end user browser's request, if predetermined conditions are satisfied;
 transmitting from the content provider original site, the request content to the requesting end user browser if the predetermined conditions are not satisfied;
 communicating a first redirection page from a content provider original site to the requesting end user browser in response to the requesting end user browser's request for particular content only if said predetermined conditions are satisfied as determined by said deamon program, the first redirection page not containing the requested content and containing a first meta-tag completely specifying a network address for redirecting the requesting end user browser to a CachePortal server, said CachePortal server serving as a first mirror site and storing at least some content stored in the content provider original site;
 receiving, at the CachePortal server, a first redirected request from the requesting end user browser, the first redirected request containing the requesting end user browser's request for particular content; and
 communicating the particular content from the CachePortal server to the requesting end user browser in response to the first redirected request, if the CachePortalserver contains the particular content; and
 communicating a second redirection page from the CachePortal server to the requesting end user browser, the second redirection page containing a second meta-tag for redirecting the requesting end user browser to load the particular content from a second mirror site browser when the CachePortal server does not contain the particular content.

22. A method for content delivery as recited in claim 21, wherein in response to the first redirected request, the method further includes the steps of:
 determining if the particular content has been stored in the second mirror site; and
 communicating the second redirection page from the CachePortal server to the requesting end user browser for redirecting the requesting end user browser to load the particular content from the second mirror site if the particular content has been stored in the second mirror site.

23. A method for content delivery as recited in claim 22, wherein in response to the first redirected request, the method further includes the steps of:
 determining an end user browser address from the first redirected request;
 locating the second mirror site from among a plurality of second mirror sites that stores the particular content;

selecting the second mirror site, from among the second plurality of second mirror sites, that is quickly accessible by the requesting end user browser based on the end user browser address; and communicating the second redirection page to the requesting end user browser for redirecting the requesting end user browser to load the particular content from the second mirror site.

24. A method for content delivery as recited in claim 23, wherein in response to the second redirection page, the method further includes the step of communicating a second redirected request from the requesting end user browser to the second mirror site, the second redirected request containing the requesting end user browser's request for particular content.

25. A method for content delivery as recited in claim 24, wherein in response to the second redirected request, the method further includes the step of communicating a third redirection page from the second mirror site to the requesting end user browser containing another meta-tag for redirecting the requesting end user browser to load the particular content from another mirror site, the CachePortal server, or the content provider original site.

26. A method for content delivery as recited in claim 24, wherein in response to the second redirected request, the method further includes the step of communicating a whole page from the second mirror site to the requesting end user browser containing the IP address of any embedded objects or linked pages that have been copied into any other of the second plurality of mirror sites.

27. A method for content delivery as recited in claim 26, wherein in response to receipt of the whole page, the method further includes the step of communicating a request from the requesting end user browser to mirror sites containing copies of the embedded objects or linked pages, for those embedded objects or linked pages.

28. A method for content delivery as recited in claim 21, wherein in response to the requesting end user browser's request for particular content, the method further includes the step of selectively directing the content provider original site to communicate the first redirection page to the requesting end user browser if the content provider original site determines that the requested content is stored in the second mirror site.

29. A method for content delivery as recited in claim 28, further including the step of selectively directing the content provider original site to communicate the first redirection page to the requesting end user browser when traffic at the content provider original site rises above a predetermined level.

30. A method for content delivery as recited in claim 21, further including the step of communicating the first redirection page to the requesting end user browser after every third request for particular content is received from any end user browser.

31. A method for content delivery as recited in claim 21, further including the step of communicating the first redirection page to the requesting end user browser only after receiving a request for particular content from requesting end user browsers in a particular location.

32. A method for content delivery as recited in claim 21, further including the step of selectively directing the content provider original site to communicate the first redirection page to the requesting end user browser only during a particular time period.

* * * * *